United States Patent [19]

van der Lely et al.

[11] 4,227,365
[45] Oct. 14, 1980

[54] MOWING MACHINE

[75] Inventors: Ary van der Lely, Maasland; Cornelis J. G. Bom, Rozenburg, both of Netherlands

[73] Assignee: C. van der Lely N. V., Maasland, Netherlands

[21] Appl. No.: 798,136

[22] Filed: May 18, 1977

[30] Foreign Application Priority Data

May 20, 1976 [NL] Netherlands ............ 7605371

[51] Int. Cl.³ .................................... A01D 55/18
[52] U.S. Cl. ........................................ 56/13.6; 56/6; 56/192; 56/295
[58] Field of Search ............... 56/6, 295, 13.6, 192, 56/16.2, 11.9

[56] References Cited

U.S. PATENT DOCUMENTS

| | | | |
|---|---|---|---|
| 2,625,784 | 1/1953 | Kelsey | 56/13.6 X |
| 2,986,864 | 6/1961 | Young | 56/503 |
| 3,017,732 | 1/1962 | Keyes | 56/11.9 |
| 3,507,102 | 4/1970 | Kline et al. | 56/16.2 X |
| 3,751,889 | 8/1973 | Overesch | 56/6 |
| 3,965,658 | 6/1976 | van der Lely | 56/192 |
| 3,974,630 | 8/1976 | van der Lely | 56/16.2 |
| 3,987,607 | 10/1976 | Bone | 56/16.2 |

*Primary Examiner*—Russell R. Kinsey
*Attorney, Agent, or Firm*—Mason, Mason and Albright

[57] ABSTRACT

A mowing machine has an elongated beam that supports side-by-side rotors with pivoted cutters positioned to cut overlapping paths in front of the beam. The rotor units include an upper rotatably hub with pivoted blades and lower bodies which house corresponding driving shafts. The units are releaseably fastened to the beam and in one embodiment, spaced apart supporting elements are fastened to the front side of the beam and a unit is fitted and bolted between elements. In another embodiment, the body of each unit is hollow so that the beam can be passed through units and the latter abutted to one another and secured in place with a single bolt. The driving shaft of each unit is interconnected to adjacent driving shafts by sleeve connectors that form an elongated drive shaft that is parallel and in front of the beam. Corresponding upwardly extending rotary shafts of the rotors have screening caps fastened by bolts and compression springs beneath the caps bear on a ring through which pivot pins extend to cutters. Removing the bolt from each shaft releases the cap, spring, ring, pins and cutters.

35 Claims, 10 Drawing Figures

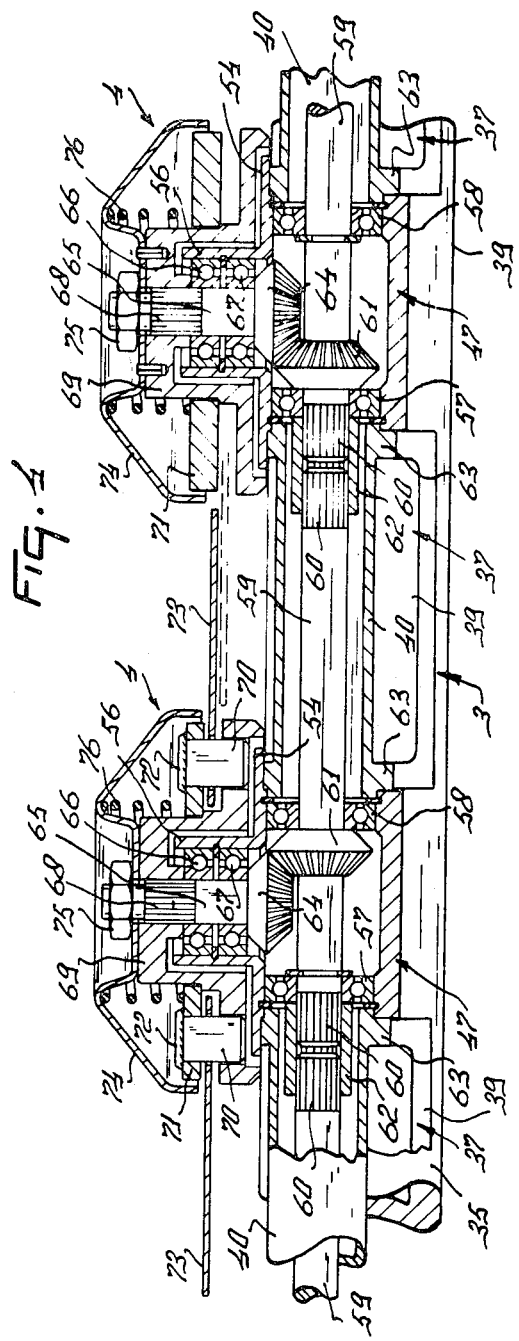

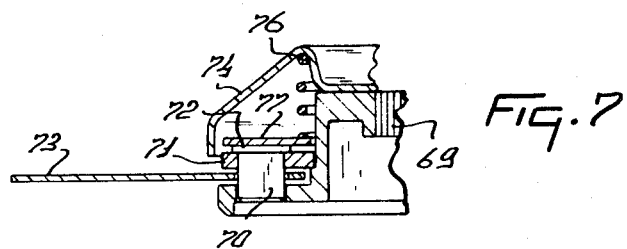
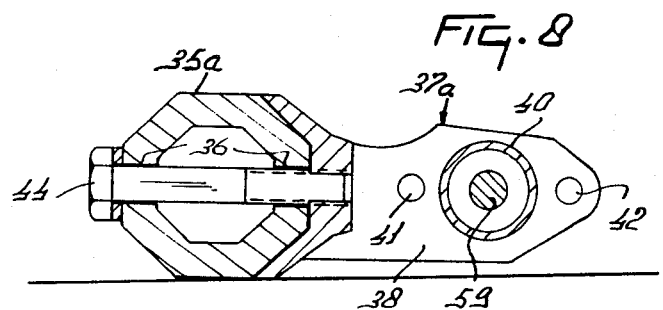
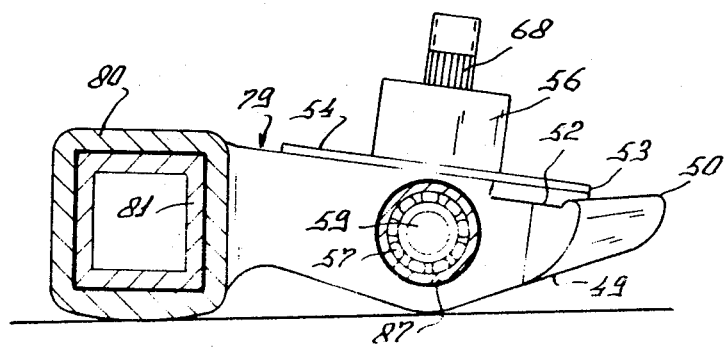

MOWING MACHINE

SUMMARY OF THE INVENTION

This invention relates to a mowing machine.

According to a first aspect of the present invention there is provided a mowing machine comprising a carrying beam and a plurality of mowing rotors mounted for rotation about upwardly extending rotary shafts, rotors being fastened to the carrying beam, which is disposed behind the rotors, with respect to the intended direction of travel of the machine, each rotor comprises at least one cutter, which is freely cutting in operation.

According to a second aspect of the present invention there is provided a mowing machine comprising a carrying beam and a plurality of mowing rotors mounted for rotation about upwardly extending shafts, each rotor being secured to the carrying beam by a single bolt.

According to a third aspect of the present invention there is provided a mowing machine comprising a plurality of rotors mounted for rotation about upwardly extending shafts, in which the machine has openings disposed between adjacent rotors, which establish a communication, in operation, between the space directly above the ground and the space above the machine.

According to a fourth aspect of the present invention there is provided a method of assembling at least part of a mowing machine comprising a carrying beam and a plurality of rotor units the rotors of which are mounted for rotation about upwardly extending rotary shafts, each rotor being provided with a drive shaft, the method comprising mounting the rotor units in turn on the carrying beam and fastening the rotor units to the carrying beam.

For a better understanding of the invention and in order to show how the same may be carried into effect, reference will be made by way of example to the following drawings, in which:

BRIEF DESCRIPTION OF THE DRAWINGS

FIG. 4 is a sectional view taken on the line IV—IV in FIG. 2;

FIG. 7 shows a variant of part of the construction shown in FIG. 6;

FIG. 8 shows a variant of the construction shown in FIG. 5;

FIG. 10 is a sectional view taken on the line X—X in FIG. 9.

DESCRIPTION OF THE PREFERRED EMBODIMENTS

Figure 1:
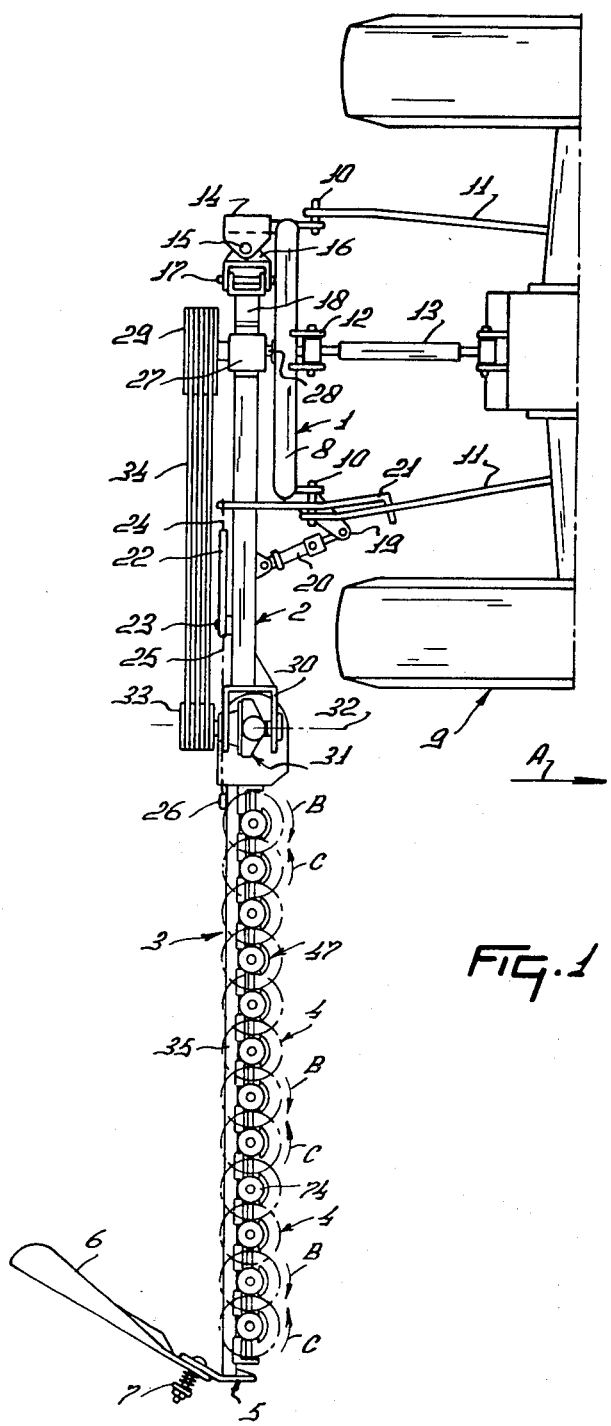
FIG. 1 is a plan view of one embodiment of a mowing machine attached to a tractor.

The mowing machine shown in FIGS. 1 to 7 generally comprises a frame which includes a fastening portion 1, a supporting member 2 and a cutting assembly 3 holding a plurality of rotor units 4 (FIG. 1). The end of cutting assembly 3 remote from the fastening portion 1 is provided with a supporting part 5 which supports cutting assembly 3 on the ground. The rear end of the supporting part 5, with respect to the intended direction of travel A, is provided with a swath board 6, which is inclined rearwardly and inwardly away from the supporting part 5 and which is resiliently secured to the supporting part 5 by means of a spring arrangement 7.

The fastening portion 1 comprises a trestle 8 which is a curved tube in the form of an inverted V or U. When the mowing machine is connected to a tractor 9, as shown in FIG. 1, the plane of symmetry of the trestle 8 coincides with the longitudinal plane of symmetry of the tractor 9. A horizontal pin 10 is provided at each depending free end of the trestle 8 and extends at right angles to the intended direction of movement A. The pins 10 extend through holes in the lower lifting arms 11 of a three point lifting device of the tractor 9. Near the top of the trestle 8 fastening means 12 are provided which are coupled with the hindmost end of the top bar 13 of the lifting device of the tractor 9. The trestle 8 extends in operation parallel to an approximately vertical transverse of the intended direction of movement A. This disposition may, however, be varied since the length of the top bar 13 is adjustable.

A fork 14 is fastened behind the trestle 8, viewed in the intended direction of movement A, and near one of its free ends. This fork 14 comprises two mutually parallel, substantially horizontal plates spaced apart one above the other. Each of these plates has a hole and the two holes are aligned. In operation the coincident center lines of these holes extend upwardly and are, in general, at a small angle to the vertical and parallel to the plane of the trestle 8.

The center lines of the holes lie in a substantially vertical plane which is parallel to the direction of movement A. Disposed in the holes is a pivotal pin 15 that pivotally mountes a coupling piece 16, which affords a bearing for a pivotal pin 17, which is disposed a short distance from the pivotal pin 15. The pivotal pins 15 and 17 are perpendicular to one another. The pivotal pin 17 is located between the pivotal pin 15 and the vertical plane of symmetry of the tractor 9. The pivotal pin 17 pivotally carries a support tube 18, which is thus pivotally connected with the trestle 8 by means of a universal joint comprising the pivotal pin 5 and 17. The support tube 18 extends laterally from the pivotal pin 17, across the plane of symmetry of the tractor, approximately to the vertical boundary plane of the tractor 8 adjacent wheel 9 extending in the intended direction of movement A. In operation, viewed on plan, the supporting tube 18 is generally perpendicular to the intended direction of movement A and, viewed from the rear, is inclined downwardly away from the fork 14.

At the end of the trestle 8 opposite the fork 14 a holder 19 is mounted which extends horizontally forwardly and outwardly. Between the free end of the holder 19 and the supporting tube 18 an overload safety device 20 is provided for restraining rearwardly pivoting of the supporting member 2 during normal operation of the machine. However, if excessive forces are applied to cutting assembly 3, the same device 20 allows such rearward movement of the supporting member 2 and cutting assembly 3 about the pivotal shaft 15. A rocker 21 is mounted to rock about the pin 10 opposite the fork 14. The front end of the rocker 21 engages, in operation, beneath the adjacent lifting arm 11. The rocker 21 curves upwardly towards the rear so that the back end is located at a distance above the supporting tube 18. On the rear side of the supporting tube 18 a substantially L-shaped lever 22 is pivotally mounted on a substantially horizontal pivot pin 23, extending in the intended direction of movement A. The ends of the lever 22 are connected respectively by means of rods, chains 24, 25 or the like, with the back end of the rocker 21 and with the upper free end of an upwardly extending lever 26 rigidly secured to the neighboring end of cutting assembly 3. On the supporting tube 18 a generally cylindrical housing 27 is journalled, which affords a bearing for an input shaft 28 and which is disposed so that its substantially horizontal axis is located approximately in the vertical plane of symmetry of the tractor 9. The output shaft of the housing 27 is located behind the supporting tube 18 and is provided with a multiple pulley 29. The output shaft is parallel to the center line of the pivotal pin 17.

The end of the supporting tube 18 opposite the fork 14 carries a fork member 30, in which a gear box 31 is pivotally journalled by means of a pivotal shaft the axis of rotation 32 of which extends parallel to the center line of the pivotal pin 17.

The gear box 31 and the cutting assembly 3 which is rigidly secured thereto are, therefore, pivotable about axis 32 relative to the supporting tube 18 of the supporting member 2. In operation cutting assembly 3 is freely pivotable relative to the supporting member 2 about axis 32. When the lifting device is raised cutting assembly 3 is pivoted upwardly, by means of the rocker 21 with the aid of the lever 22 and the rods or chains 24, with respect to the supporting member 2. On its rear side, the gear box 31 is connected to drive a multiple pulley 33, aligned with pulley 29, so that the grooves of each pulley receiving the same belt are equally spaced from a plane perpendicular to the mutually parallel rotary axes. The pulleys 29 and 33 have in this embodiment either three or four grooves which receive V-belts 34.

Figure 5:
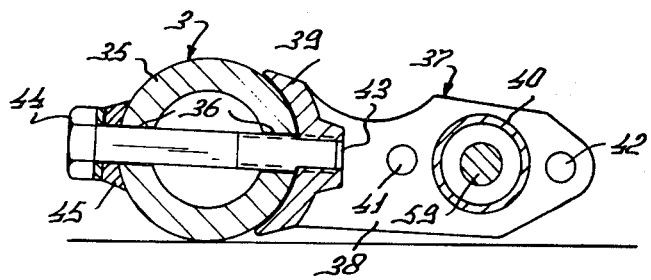
FIG. 5 is a sectional view taken on the lines V—V in FIG. 2.

Cutting assembly 3 is rigidly secured to the gear box 31 and extends, in its operative position, laterally outwardly therefrom and substantially perpendicular to the intended direction of movement A. In the embodiment shown in FIGS. 1 to 6 cutting assembly 3 comprises a supporting tube 35 disposed behind the rotors 4 and extending laterally from the gear box 31 to the supporting member 5, which may be a wheel. The supporting tube 35 shown in these Figures has a torsion resistant of circular cross-section having a wall of comparatively large thickness. Along its length the supporting tube 35 has uniformly spaced fastening holes 36, the mutually parallel center lines of which pass through the centre of the circular tube 35 and are substantially parallel to the intended direction of movement A (see FIG. 5). The location of each hole 36 determines the location of a respective supporting element 37 located in front of the supporting tube 35 and secured thereto. Each supporting element 37 is generally U-shaped, viewed on plan (FIG. 2), the limbs 38 of which are perpendicular to the supporting tube 35 and are generally parallel to the intended direction of movement A. The web 39 between the limbs 38 is clamped to the front portion of the supporting tube 35. The limbs 38 of the supporting element extend forwardly in the intended direction A away from the supporting tube 35. Viewed axially relative to supporting tube 35, the two limbs 38 of each supporting element 37 have the shape illustrated in FIGS. 5 and 6. The two limbs 38 of each supporting element 37 are interconnected adjacent their forward ends by a screening member comprising a spacer tube 40 having a circular cross-section, the center line of which is parallel to the web 39 and to the center line of the supporting tube 35. The spacer tube 40 may be integral with the limbs 38 and the web 39. The two limbs 38 of each supporting element 37 have fastening holes 41 and 42, located one on each side of the spacer tube 40. The center lines of the fastening holes 41 and 42 and of the spacer tube 40 are coplanar. Web 39 of each supporting element 37 has a concave surface where it engages tube 35 (FIG. 5). The web 39 has a fastening hole 43, the center line of which, when mounted is aligned with the center line of the respective fastening hole 36 in the supporting tube 35. The fastening hole 43 is internally screw-threaded. Each supporting element 37 is clamped to the front of the supporting tube 35 by means of a bolt 44 which extends through the hole 36 and is screwed into the tapered hole 43. The head of the bolt 44 engages the rear portion of the supporting tube 35 through a washer 45. The supporting element 37 is thus fixed in place on the supporting tube 35 by the bolt 44. If a stronger connection is required, it is possible to use a commercially available supporting tube 35 of circular cross-section and having on its outer circumference a ridge 46 which extends axially of the tube (see FIG. 6). If the ridge 46 is disposed on the front of the tube 35 the web 39 of each supporting element 37 has a corresponding recess, the ridge 46 locates the supporting element 37 on the tube 35 and relieves bending loads on the bolt 44.

There is a gap between the adjacent limbs 38 of each two adjacent supporting elements 37. In each gap is fixed a rotor body 47 accommodating parts of the mechanical drive for the respective rotor unit 4.

Figure 2:
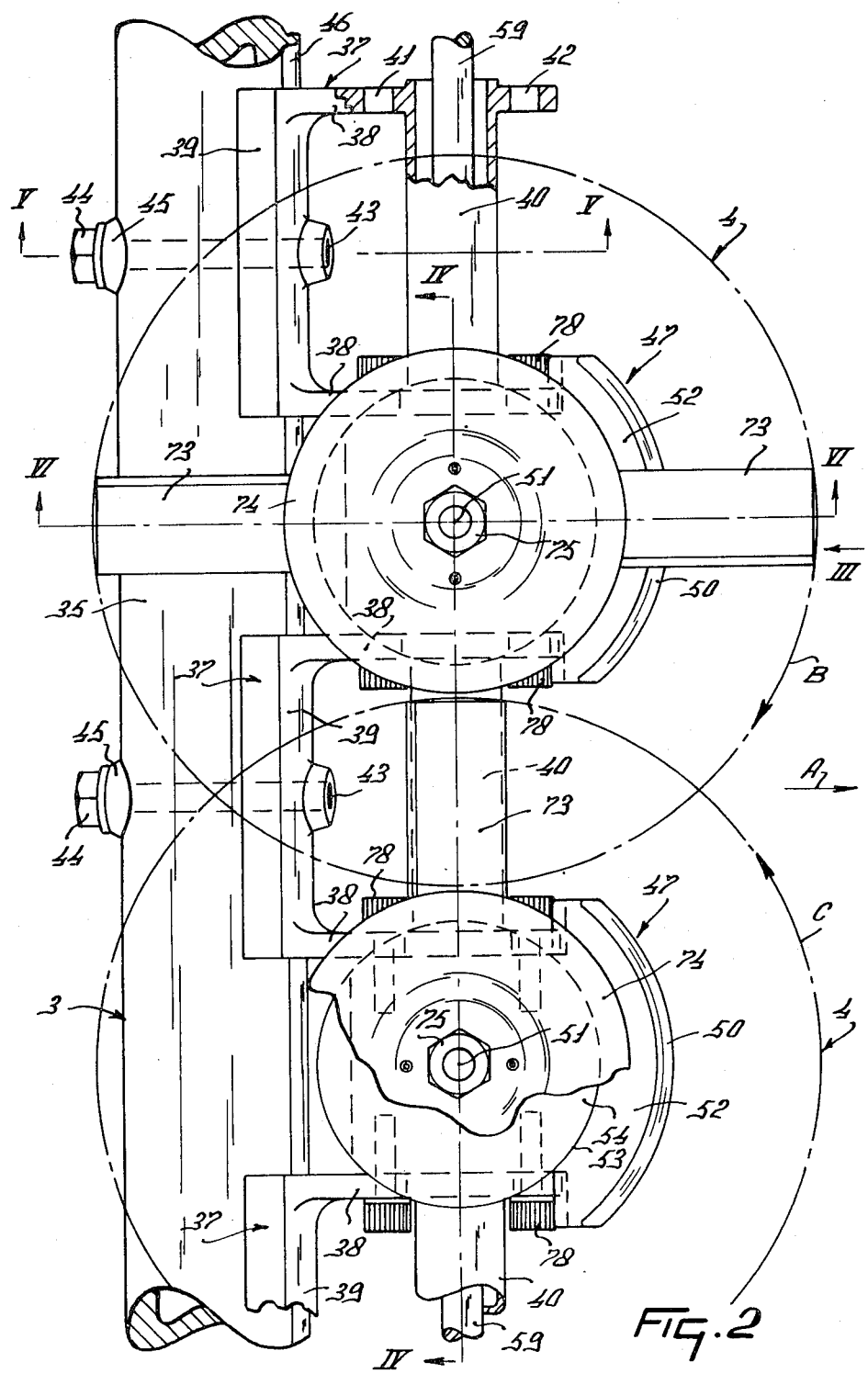
FIG. 2 is a plan view of part of the mowing machine shown in FIG. 1.
Figure 3:
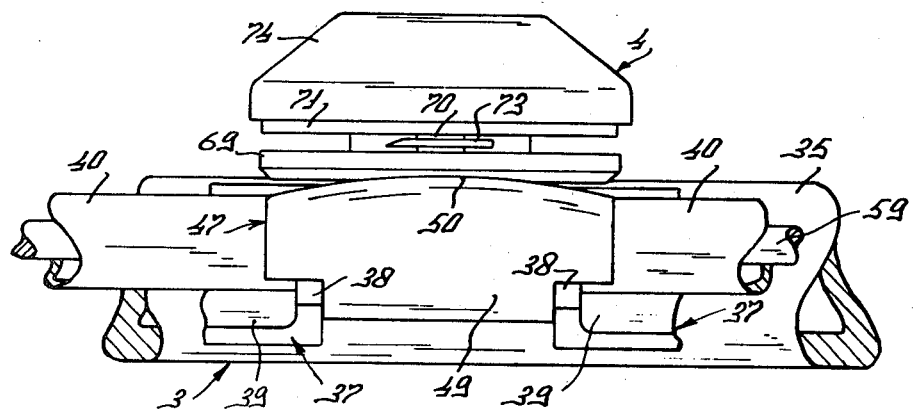
FIG. 3 is a view taken in the direction of the arrow III in FIG. 2.

On its lower side, each rotor body 47 (FIG. 6) has a shape defining two surfaces 48 and 49, the surface 48 being flat and being, in the mounted state, parallel to the supporting tube 35. The surfaces 48 and 49 diverge upwardly, as seen from the side. The transitional surface between the two surfaces 48 and 49 is located, in the mounted state, approximately beneath the common center line of the spacer tubes 40. The front surface 49 is curved at its upper region, which curved surface is on a screening rim 50 in the form of an upwardly extending flange, which is arcuate, viewed on plan (FIG. 2) and which subtends an angle of about 90° from its central axis 51. This central axis 51 is located above the common center line of the spacer tubes 40. The screening rim 50 is disposed forward of a substantially horizontal surface 52, which constitutes, together with the rim 50, an arcuate gutter-shaped space (FIG. 6), which surrounds the central axis 51. Behnid the surface 52 is a cylindrical wall 53, which extends upwardly from the surface 52 and which terminates at its the top side in a surface 54, which is substantially horizontal during normal operation. Viewed on plan, the surface 54 is annular and surrounds the central axis 51 in the form of a circle. The rear surface 48 terminates through a curved junction surface 55 at the rear edge of the surface 54. The gutter-shaped space bounded by the flange-shaped rim 50, the surface 52 and the wall 53 terminates at both ends adjacent the spaces between the rotor body 47 concerned and the neighboring rotor bodies 47. The rotor body further includes a cylindrical flange that extends upwardly from boundary face 53 and is concentric with central axis 51. Viewed in a direction parallel to the intended direction of movement A, the flange 50 extends on either side of the rotor body 47 over a given distance beyond the two vertical boundary faces at the sides of the surface 49 (FIG. 3). The rotor body 47 is constructed symmetrically with respect to a vertical plane parallel to the intended direction of movement and containing the central axis 51.

Each rotor body 47 has on each side a generally circular opening (FIG. 4). The center lines of these openings are in line and coincide with the common center line of the spacer tubes 40. The openings accommodate bearings 57 anmd 58 for supporting a driving shaft 59. Each driving shaft 59 has axial splines 60 at its ends. Each driving shaft 59 carries a bevel gear 61. On the free end of the shaft 59 projecting from the bearing 57 is a coupling element constituted by a union socket 62 having internal splines matching the external splines 60 on the shaft 59. The same union socket 62 receives relatively non-rotatably the external splines of the adjacent driving shaft 59 by means of its splines 60 at the end remote from the respective bearing 57. Thus a union socket 62 is provided near each rotor unit 4 for transmitting torque between two adjacent shafts. The two spacer tubes 40 located one on each side of each rotor body 47 extend partly into the openings in the rotor body 47 and their ends are a short distance from the respective bearings 57 and 58. The rotor bodies 47 thus locate the spacer tubes 40. Near both ends each spacer tube 40 is provided with flanges 63 which engage corresponding surfaces in two adjacent rotor bodies 47 so that these boundary faces of the flanges 63 together with the distance between the holes 36 determine the distance between the rotor bodies 47.

Each bevel gear 61 is in mesh with another bevel gear 64 at the lower end of an upwardly extending shaft 65. The center line of the shaft 65 coincides with the central axis 51 (FIG. 2). The center line of the shaft 65 also coincides with the center line of the cylindrical flange 56. The shaft 65 is rotatably supported within the cylindrical flange 56 by two bearings 66 and 67 disposed one above the other. The shaft 65 has axial splines 68 near its top end for receiving a rotation-symmetrical hub 69.

A radially inner portion of the hub 69 extends over the upper edge of the cylindrical flange 56, while a radially outer portion of the hub 69 extends downwardly to surround the outer side of the flange 56. The latter, outer, portion of the hub 69 extends to near the face 54 of the rotor body 47 and then outwardly beyond the circular boundary of the face 54. The radially outermost, flange-like portion of the hub 69 embraces part of the cylindrical wall 53 of the rotor body 47 and at the front it extends downwardly by a small distance inside the gutter-shaped space behind the flange 50 of the rotor body 47. In operation, this aids the movement of crop in that space. The portion of the hub 69 disposed above the face 54 of the rotor body 47 has two diametrically opposite holes in which pivotal shafts constituted by cylindrical pins 70 are journalled, the center lines of which are parallel to the centre line of the shaft 65. The greater part of each pin 70 is above the respective hole in the hub 69. The upper portion of pins 70 are further journalled in aperatures which extend through a ring 71, which encircles the outer side of the downwardly extending portion of the hub 69. Each pin 70 has at the top a head 72, the bottom of which engages the upper surface of the ring 71. The lower surface of the ring 71 is supported on a shoulder at a distance above the top of the outwardly extending portion of the hub 69 which has the holes within which the lower ends of the pins 70 are journalled. Between this portion of the hub 69 and the lower surface of the ring 71 a cutter blade 73 is pivotally mounted on each pin 70. Each blade has a hole near one end through which the respective pin 70 extends. If a blade 73, which is rectangular on plan, is orientated radially with respect to the central axis 51, the path of rotation of the end of the blade remote from the respective pin 70 is located, as viewed on plan, a short distance from the outermost, circular boundary of the hub 69, or of the ring 71 of the same size, of the neighboring rotor unit 4.

The top side of the radially inner portion of the hubs 69 supports the radially inner part of a dish-shaped cap 74. The cap 74 is rotationally symmetrical and, in operation, rotates with the hub 69. The cap 74 is secured to the upper surface of the hub 69 by fastening means constituted by a nut 75 screwed onto the top end of the shaft 65. The shape of the cap 74 is shown in the sectional view of FIG. 4, which shows that the outermost and lowermost edge of the cap 74 is located beyond the outer edge of the ring 71 a short distance above the blades 73. Near the top, each cap 74 has an outwardly and downwardly inclined portion which promotes the movement of mown crop off the cap 74 during rotation thereof. Between the top of the ring 71 and the inside or bottom surface of the cap 74 is arranged a compression spring 76, which presses the ring 71 against the shoulder on the outer side of the downwardly extending portion of the hub 69. The head 72 of each pin 70 may be rigidly secured to the upper surface of the ring 71; alternatively, each pin 70 may be loosely arranged in the ring 71, the shape of the cap 74 then preventing the pins 70 from jumping out upwardly from the holes in the hub 69. Another possible construction is shown in FIG. 7, in which the compression spring 76 does not exert pressure directly on the ring 71 but engages a ring 77 located above the ring 71. The lower surface of the ring 77 bears on the top of the head 72 of the pin 70. The compression spring 76 and the ring 77 prevent the pin 70 from escaping from the hub 69 in the upward direction. Whichever construction is used, the blades 73 can be released by unscrewing the nut 75 and removing the cap 74, the spring 76, the ring 71 (and the ring 77 if fitted) and the pins 70.

If the blades 73 of two neighboring rotor units 4 are required to rotate in different planes, the outwardly extending portion of the hub 69 located directly above the surface 54 of the neighboring rotor unit is thinner, as is shown in FIG. 4 for the right-hand rotor unit, and the shoulder on the outer side of the downwardly extending portion of the hub 69 is disposed at a lower position. The ring 71a is thicker, so that the same compression spring 76 can be used. By alternating the two constructions shown in FIG. 4, the blades of adjacent rotor units are located at different levels from one another.

It should be noted that alternate bevel gears 61 are located on different sides of the respective bevel gears 64 in order to ensure that the directions of rotation of the blades 73 of adjacent rotor units are in opposite senses as is indicated in FIG. 2 by the arrows B and C.

Each rotor body 47 is fastened by means of two pairs of hollow screws 78 to adjacent supporting elements 37. The screws 78 pass through the holes 41 and 42 (FIG. 5) of the limbs 38 of the supporting elements. Each rotor unit 4 comprises the respective rotor body 47 and a rotor which comprises all the parts which rotate with the respective shaft 65 about the central axis 51.

Each rotor unit 4, comprising the rotor body 47, the hub 69, the cutters 73, the ring 71, the compression spring 76 and the cap 74 as well as the respective drive shaft 59 can be completely assembled before it is mounted on the support beam 35. When each rotor unit 4 is mounted, a union socket 62 is slipped over the end of the respective shaft 59.

From the gear box 31 protrudes a laterally extending output shaft, the free end of which is similar to that of each shaft 59. Over this output shaft is placed the spacer tube 40 of the first supporting element 37. This supporting element is then fastened by means of a bolt 44 to the supporting tube 35. Subsequently the first rotor unit 4 is moved towards the side of the outermost limb of the supporting element 37 already mounted so that the output shaft from the gearbox 31 engages the splines of the union socket 62 fitted on the end of the shaft 59 of the rotor unit 4, after which the rotor body 47 is fastened by means of the hollow screws 78 to the limb 38. The rotor body 47 and the supporting element 37 together constitute a support for the rotor unit 4. Over the laterally projecting drive shaft 59 of the mounted rotor unit 4 is placed the next spacer tube 40 of a second supporting element 37, which is again fastened by a bolt 44 to the supporting tube 35. Subsequently a second rotor unit 4 (the bevel gear wheel 61 of which is in mesh on the other side with the respective bevel gear wheel 64 to that of the previous rotor unit 4, and the cutters of which are set at a different level from those of the previous rotor unit 4) is slipped against the outermost limb 38 of the second supporting element so that the drive shaft 59 of the first rotor unit 4 engages the union socket 62 of the second rotor unit 4. The second rotor unit 4 is then also fastened by hollow screws 78 to the second supporting element 37, which has in the meantime been secured by means of hollow screws 78 to the first rotor unit. These operations are repeated for each supporting element 37 and the rotor unit 4 until the last supporting element 37 in place. The number of rotor units are thus fastened by an equal number of bolts to the supporting tube 35.

Figure 6:
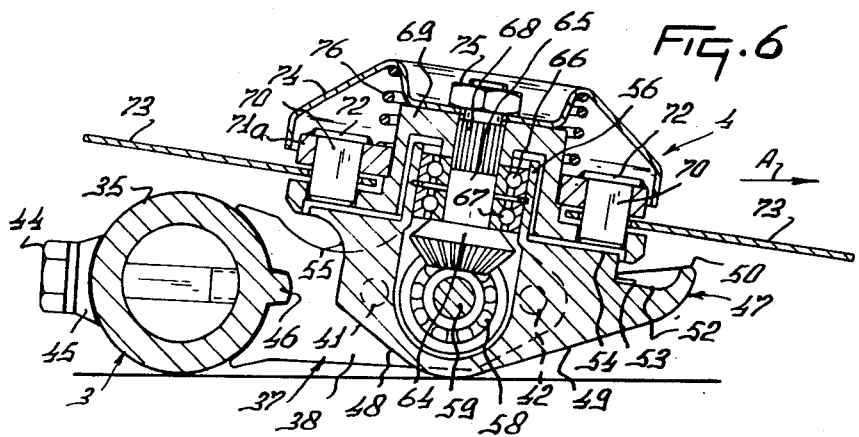
FIG. 6 is sectional view taken on the lines VI—VI in FIG. 2.

It should be noted that, as is apparent from FIG. 6, The disposition of the rim 50 is such that, viewed on plan, only half the length of each blade 73, when directed towards the front, projects beyond the rim 50. Thus the mid point of each blade 73 travels directly above the rim 50. If, viewed on plan, a blade 73 is away from the region of the rim 50, the blade projects over a materially larger length (60 to 80%, preferably 70% or more) beyond the outermost boundary of the hub 69.

FIG. 8 shows a variant of the construction shown in FIG. 5 and 6, in which the supporting tube 35a has a hollow octagonal cross-section and the rearwardly extending boundary surface of each supporting element 37a engages three contiguous side faces of the supporting tube 35a and is tightened in a similar manner to that already described by bolts 44. Turning of a supporting element 37a about the supporting tube 35a is prevented completely by the tightening force of the bolt 44, while this bolt is not subjected to large bending forces. The supporting tube 35a could have other shapes of cross-section, such as hexagonal.

Figure 9:
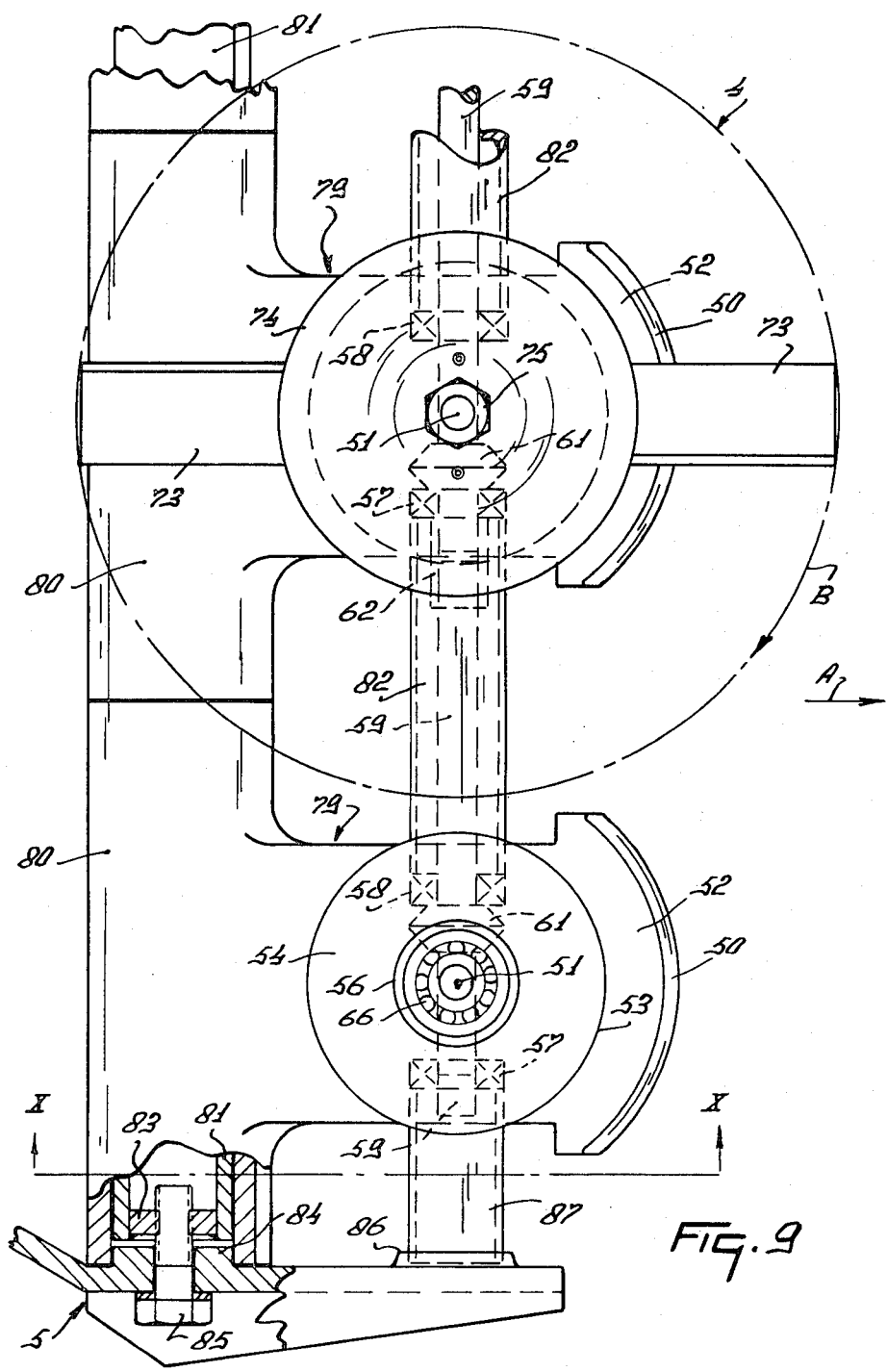
FIG. 9 is a plan view of part of the construction of a second embodiment of a mowing machine.

In the embodiment shown in FIGS. 9 and 10 the assembly of the mowing machine according to the invention is carried out in a different way. The rotors are the same as in the preceding embodiments, but in this case each rotor body (designated in FIGS. 9 and 10 by 79) is provided at its rear side with an integral fastening piece 80. This the rotor body 79 with the fastening piece 80 constitutes in this embodiment the supporting element for the rotor unit. As is apparent from the side elevation of FIG. 10, the fastening piece 80 has a square or rectangular cross-section, the square or rectangular bore of which intimately fits over a supporting tube 81. The supporting tube 81, replacing the supporting tube 35 of the preceding embodiments, extends from the gear box to the supporting part 5 and is formed by a hollow beam of square or rectangular cross-section. The fastening piece 80, located behind the rotor body 79, is wider than the rotor body and is symmetrical about a vertical plane parallel to the intended direction of movement A and containing the central axis 51. The fastening piece 80 extends beyond the vertical boundary faces of the rotor body 79 and has, measured along the supporting tube 81, a width equal to the distance between the center lines of the bolts 44 and to the distance between the vertical planes of symmetry of two adjacent supporting elements 37 of the preceding embodiments. The drive shafts 59 are surrounded by screening members or spacer tubes 82 corresponding to the spacer tubes 40 of the preceding embodiments. The tubes 82 are located in openings in the sides of adjacent rotor bodies 79, and engage stop surfaces disposed in the openings at right angles to the shaft 59. In the supporting tube 81 at its outermost end is welded a partition 83 having a tapped hole (FIG. 9). The supporting part 5 is provided with a square fitting piece 84 engaging within the endmost fastening piece 80. The supporting part 5 has a hole which receives a bolt 85. This bolt is screwed into the tapped hole in the partition 83.

The supporting tube 81 is rigidly secured to the gear box 31. The rotor units comprising the rotors and the rotor bodies 79 with the fastening pieces 80 are simply slipped onto the supporting tube 81 in the correct order of succession (governed by the required directions of rotation and the levels of the cutters), a spacer tube 82 being each time placed over the corresponding driving shaft 59 and put into contact with the vertical stop surface in the rotor bodies 79. The rotor units are, therefore, slipped loosely onto the tube 81, while ensuring that adjacent rotors are rotated by 90° relative to each other, as in the preceding embodiments. All the rotor units 4, once arranged in place, are fixed by means of only the single bolt 85, which also secures the supporting part 5a.

The supporting part 5a has a shoulder 86, in which a cavity is provided on the side facing the end most rotor unit. The cavity receives an end spacer tube 87, the outer end of which engages, in the manner described above, a stop surface in an opening in the rotor body 79 for closing the outer end of the last driving shaft 59.

It should be noted that instead of using a supporting tube 35 as in the first embodiment, a supporting beam of U-shaped cross-section may be used, with the web vertical and the two limbs extending rearwardly away from the web in a substantially horizontal direction. The supporting elements 37 and the rotor bodies 47 would then be located at the front of the supporting beam and bolted to the front of the web. Such a supporting beam has the advantage that machining holes and mounting may be simpler than for a tubular supporting beam under some conditions.

The machines described operate as follows.

A power take-off shaft of the tractor 9 is coupled by an auxiliary shaft with the input shaft of the housing 27 and hence also with the rotary shaft of the pulley 29. The rotary movement is transmitted by means of the three V-belts 34 passing around the pulleys 29 and 33 to an input shaft of the gear box 31. The free end of the output shaft of the gear box 31 is connected by the union socket 62 to the drive shaft 59 of the neighboring rotor unit 4. This directly drives the first rotor, while the outer end of that shaft 59 extends into the union socket 62 of the second rotor unit, which is again connected to the drive shaft of the third rotor unit and so forth. The machine and its drive are proportioned so that approximately midway along their operative lengths the cutters have a speed of about 90 ms/sec or more with a speed of rotation of about 8600 rev/min or more. Each blade 73 is preferably made from thin material, and preferably weighs thirty grams.

Viewed on plan, a cutting region for the blades is available between the rotor bodies 47 during a mowing operation up to the front of the spacer tubes 40 located behind the front sides of the rotor units. Also the use of a large overlap of the blades of adjacent rotor units is allowed. The effective width of this overlap near the front of the tubes 40 is about 70% of the overall length of the blades. The result of this is that the mowing machine embodying the invention can be run very fast without crop being left uncut by the blades. The cut crop is passed, with the help of the sloping surface of the rotating caps 74, between adjacent rotor units rotating in opposite senses. The crop is passed across and over tubes 40 and the supporting tubes 35 and the fastening piece 80 in a downward direction to be deposited in a swath having a width approximately equal to the distance between two neighboring hubs 69. The screening members 40, 82 prevent the crop from being wound around the shafts 59. It is important in both embodiments that, between on the one hand the supporting tube 35 or the webs 39 of the supporting elements 37 and the front of the fastening piece 80 and on the other hand the spacer tubes 40 and 82, an opening should be available between the space located directly above the ground and the space above the machine so that cut crop may drop down through this opening. A second delivery path for the crop is thus afforded, which is particularly important in the event of large quantities of crop to be cut, which might otherwise fill the space above the supporting tube 35 and the fastening piece 80 and the bottom side of the blades 73.

If the blades 73 strike obstacles they may be caused to pivot about the respective pins 70. This subjects the pins 70 to abrupt, very heavy forces due to the abrupt acceleration of the blades about the pins journalled at two places. These forces would be extremely high, should the blade strike an obstacle at a point located comparatively near the pin 70 concerned. In order to avoid such heavy loads on the pins 70, the rim 50 is disposed so that at the front of the rotor body 47 concerned, viewed on plan, the blade is covered over about half its length so that, when the blade strikes an obstacle, said distance is large enough to avoid very heavy loads on the pin 70 concerned. The small inertia of the blade in itself helps to prevent the exertion of heavy forces on the pin. The blade 73 deflects behind the rim 50, which thus serves again as a screening rim. Crop cut in front of the rotor body 47 can be transported along the gutter-shaped space formed by the rim 50, the surface 52 and the wall 53 in the directin of rotation of the blades and is delivered from the gutter-shaped space at the region of the machine where the swath is deposited. When during normal rotation the blades do deflect about the pin concerned due to heavy forces of the crop or due to obstacles, blades of adjacent rotors still cannot touch one another, since they are rotating at different levels, as is described with reference to FIG. 4. It is possible to use more than two blades on each rotor.

The cutters can be replaced in a very simple manner, since it is only necessary to losen the nut 75 of a rotor, after which the cap 74, the compression spring 76 and the ring 71 or the ring 77 need be removed for taking out the pin 70, the cutter being then replaced. It should furthermore be noted that the stalks to be cut upon being engaged by the surface 49 of the rotor body 47 will be bent relatively more forward at a given instant than the stalks simultaneously engaged by the spacer tubes 40 so that a very satisfactory moving effect is obtained in the ver large overlap region, the width of which is substantially equal to the whole cutting length of a blade.

The mode of mounting the machine in these embodiments is discussed above. It will be appreciated that the machine is assembled from separate elements comprising the supporting tubes 35, 81, supporting elements 37 and rotor units 4 having rotor bodies 47 or rotor bodies 79 with integral fastening pieces 80. In both cases the mounting operations can be carried out in the manner described above, the separate units being mounted in a given order of succession on the supporting tube concerned. It is to be understood that the invention is not restricted to the description and the claims, but also is intended to relate to the details of the Figures whether or not described.

What we claim is:

1. A mowing machine comprising a frame which includes a beam and plurality of cutting rotors mounted along the length of said beam of said frame, driving means engaging said rotors, said rotors including upwardly extending drive shafts and being rotatable about corresponding axes defined by said upwardly extending drive shafts and said driving means engaging said rotors, said beam extending transverse to the rear of said axes with respect to the normal direction of travel, each of said rotors being releaseably fastened as a unit to said beam and each said unit comprising an upper rotatable hub and lower stationary body, a respective said drive shaft of said rotor being supported by said body.

2. A mowing machine as claimed in claim 1, including a coupling element wherein the drive shafts of two adjacent rotors are intercoupled by said coupling element.

3. A mowing machine as claimed in claim 2, wherein said coupling element comprises a union socket having internal splines.

4. A mowing machine as claimed in claim 3 including a screening rotor member, wherein said screening member comprises a tube positioned between adjacent rotors.

5. A mowing machine as claimed in claim 3, wherein said screening member is spaced in front of said beam and an opening is formed between the beam and said member.

6. A method of assembling a plurality of mower units together side-by-side to form a mowing machine, comprising sliding a hollow fastening piece of each unit on an elongated supporting beam and abutting those units at one side of the beam, interconnecting corresponding driving shafts of neighboring rotors by sliding sockets and bridging the driving shafts to form an elongated drive shaft that extends substantially parallel to the beam and in front thereof, and thereafter bolting a fitting piece to the ends of the supporting beam and the drive shaft to secure the units in place.

7. A mowing machine comprising a frame including a beam and a plurality of cutting rotors mounted along the length of said beam, each said rotor including an upwardly extending shaft, said rotors being rotatable about the axes of said upwardly extending shafts of said rotors, driving means supported by said beam engaging said shafts of said rotors, said beam extending transversely and to the rear of said axes with respect to the machine's normal operative direction of travel, each rotor comprising pivot means and at least one pivoted cutter that is mounted on said pivot means to pivot freely and cut crop or the like in advance of said beam.

8. A mowing machine as claimed in claim 7, comprising supporting elements wherein each said rotor is connected to said beam by at least one said supporting element which engages the forward side of said beam.

9. A mowing machine as claimed in claim 7, comprising bolt means wherein each said rotor is fastened to said beam by said bolt means.

10. A mowing machine comprising a frame including an elongated beam and a plurality of cutting rotors mounted along the length of said beam, each said rotor including an upwardly extending shaft, each of said rotors being rotatable about a corresponding axis of said upwardly extending shaft of said rotor, and driving means which is provided to engage each said shaft of each said rotor, said beam extending transversely and to the rear of each said axis with respect to the machine's normal operative direction of travel, bolt means associated with each said rotor and said beam, each said rotor being releasably interconnected to said beam by said bolt means, each said rotor being adapted to be assembled and disassembled as a unit from said beam together with its respective said shaft and means provided thereon for engaging said driving means.

11. A mowing machine as claimed in claim 10, wherein a plurality of supporting elements are connected to the forward side of said beam, each two adjacent rotors being releasably fastened to the same respective supporting element.

12. A mowing machine as claimed in claim 10, comprising a plurality of supporting elements connected to said beam, wherein each said rotor comprises a unit which includes a rotatable hub and a rotor body, each said unit being fastened to two said supporting elements.

13. A mowing machine as claimed in claim 10, wherein said beam comprises a tube of a substantially circular cross-section.

14. A mowing machine as claimed in claim 10, wherein said driving means comprises a plurality of horizontal drive shafts, at least one said horizontal drive shaft for engaging said upwardly extending shaft of each said rotor, said drive shafts for two adjacent rotors being intercoupled by a coupling element comprising a union socket having internal splines.

15. A mowing machine as claimed in claim 14, wherein each said horizontal shaft is surrounded by a screening member.

16. A mowing machine as claimed in claim 15, wherein said screening member comprises a tube positioned between adjacent rotors of said rotors.

17. A mowing machine comprising a frame including an elongated beam and a plurality of cutting rotors mounted along the length of said beam, each said rotor including an upwardly extending shaft and being rotatable about a corresponding axis defined by said upwardly extending shaft of said rotor, driving means engaging said rotors, said beam extending transversely and to the rear of each said axis with respect to the machine's normal direction of operative travel, each of said rotors being releasably mounted as a unit on said beam by connection means whereby the corresponding said shaft of each said unit and said driving means are spaced in advance of said beam, whereby there is an opening as seen from above to the underlying ground between adjacent said rotors when viewed in plan.

18. A mowing machine as claimed in claim 16, wherein said screening member is spaced in front of said beam whereby there is an opening between said beam and said screening member.

19. A mowing machine as claimed in claim 18, wherein each said opening is bounded on all sides, said driving means comprising corresponding driving shafts which define the front side of each said opening.

20. A mowing machine as claimed in claim 18, wherein each said rotor comprises at least two cutters which are freely pivoted to an upper rotatable hub which is included in each said rotor.

21. A mowing machine as claimed in claim 20, wherein each said rotor includes a screening cap rigidly connected to the corresponding said upwardly extending shaft, said cap being located above said cutters of the corresponding said rotor.

22. A mowing machine as claimed in claim 21, wherein each of said two cutters is held by a corresponding pin, each said pin being journalled at two places, above and below the cutter.

23. A mowing machine as claimed in claim 22, comprising an upper ring associated with said pin, wherein each said pin is journalled in a hub of its corresponding said rotor and in an upper ring positioned around at least part of each said hub.

24. A mowing machine as claimed in claim 23, comprising a compression spring associated with said ring, wherein each said ring is resiliently urged downwardly towards said hub by a compression spring which is held in compression between said screening cap and said ring.

25. A mowing machine as claimed in claim 24, comprising fastening means associated with said screening cap, wherein each said screening cap is secured by fastening means to the corresponding said upwardly extending shaft, each said cap, spring, ring, at least one said pin and cutter held thereby being releasably fastened together by said fastening means.

26. A mowing machine as claimed in claim 20, wherein each said rotor includes a lower stationary body and a screening rim on said body which is located beneath said cutters.

27. A mowing machine as claimed in claim 26, wherein substantially the midpoint of each said cutter is spaced directly over said rim.

28. A mowing machine as claimed in claim 26, wherein a space for receiving and delivering crop is defined in each said rotor behind said rim, said space having the shape of a gutter which opens out between its respective said rotor and an adjacent said rotor.

29. A method of assembling a plurality of rotor units of a mowing machine in a connected said-by-side disposition, the method comprising the steps of positioning and fastening each unit successively at one side of an elongated beam along the length thereof, interconnecting corresponding driving shafts of neighboring rotors by sliding sockets whereby said driving shafts are formed into an elongated drive shaft which extends substantially parallel to said elongated beam and in front thereof.

30. A mowing maching comprising a frame including an elongated beam and a plurality of cutting rotors fastened to the forward side of said elongated beam, each of said rotors comprising an upwardly extending shaft and a hub on said upwardly extending shaft, driving means for rotating each said shaft connected thereto, said driving means adapted to rotate said shaft of each said rotor, said hubs and said shafts being positioned in front of said beam with respect to the machine's normal operative direction of travel, a plurality of cutters being pivoted to each said hub for free pivotal movement about respective upwardly extending pins releasably which are secured to each said hub, bolt means fastened to said beam securing said rotors side-by-side in a row extending transversely to said direction of travel.

31. A mowing machine comprising an assemblage of similar mower units which are fastened together side-by-side, each unit comprising a unit body, a vertical rotor on said unit body, a horizontal driving shaft extending through said unit body which is connected to rotate said rotor and which is provided on each end with means for interconnection to the like horizontal driving shafts of adjacent units, a cutter means mounted on said vertical rotor, and readily detachable securing means on each said unit body for securing it to adjacent unit bodies in a side-by-side relationship.

32. A mowing machine in accordance with claim 31, comprising an elongated supporting tube, each said unit body being secured to said tube by said securing means.

33. A mowing machine in accordance with claim 32, wherein said interconnecting means comprises sliding sockets whereby said shafts when connected comprise an elongated drive shaft which extends parallel to said elongated supporting tube.

34. A mowing machine in accordance with claim 32, wherein each said unit body extends forwardly of said elongated supporting tube.

35. A mowing machine in accordance with claim 31, wherein cutter blade engagement means is included in each said rotor, said engagement means including a compression spring causing said engagement means to be urged towards said cutter blade whereby said said compression spring assists in affixing said cutter blade on said vertical rotor.

* * * * *